United States Patent
Gjärdman et al.

(10) Patent No.: US 10,412,127 B2
(45) Date of Patent: Sep. 10, 2019

(54) METHOD AND APPARATUS FOR ESTABLISHING AN ADDITIONAL SESSION TO AN ANONYMOUS USER

(71) Applicant: Telefonaktiebolaget LM Ericsson (publ), Stockholm (SE)

(72) Inventors: Jan Gjärdman, Farsta (SE); Jan Lidin, Huddinge (SE); Anders Lindgren, Älvsjö (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 210 days.

(21) Appl. No.: 15/309,536

(22) PCT Filed: May 20, 2014

(86) PCT No.: PCT/EP2014/060336
§ 371 (c)(1),
(2) Date: Nov. 8, 2016

(87) PCT Pub. No.: WO2015/176746
PCT Pub. Date: Nov. 26, 2015

(65) Prior Publication Data
US 2017/0180432 A1    Jun. 22, 2017

(51) Int. Cl.
| | | |
|---|---|---|
| G06F 15/16 | (2006.01) |
| H04L 29/06 | (2006.01) |
| H04M 3/42 | (2006.01) |
| H04M 7/00 | (2006.01) |

(52) U.S. Cl.
CPC ........ H04L 65/1093 (2013.01); H04L 65/105 (2013.01); H04L 65/1006 (2013.01);
(Continued)

(58) Field of Classification Search
CPC ............. H04L 65/1093; H04L 65/1006; H04L 65/1016; H04L 65/1046; H04L 65/105;
(Continued)

(56) References Cited

U.S. PATENT DOCUMENTS 5,860,136 A * 1/1999 Fenner ............... H03M 7/4006
370/396
7,181,768 B1 * 2/2007 Ghosh ................. G06F 21/552
726/23
(Continued)

FOREIGN PATENT DOCUMENTS

EP    1914973 A1    4/2008

OTHER PUBLICATIONS

3rd Generation Partnership Project, "3rd Generation Partnership Project; Technical Specification Group Services and System Aspects; IP Multimedia Core Network Subsystem (IMS) Multimedia Telephony Service and supplementary services; Stage 1 (Release 12)", Technical Specification, 3GPP TS 22.173 V12.5.0, Mar. 1, 2014, pp. 1-72, 3GPP, France.

(Continued)

*Primary Examiner* — Sm A Rahman
(74) *Attorney, Agent, or Firm* — Sage Patent Group (57) ABSTRACT

The invention is about a method in a network node (11; 12; 50) of an Internet Protocol Multimedia System, IMS, for establishing an additional session between a local user equipment, UE (10; 60), which is registered in the IMS, and a remote UE (20) which public identity is unknown to the local UE (10; 60), wherein a first session is established between the local UE (10; 60) and the remote UE (20), comprising the steps of: —storing a relation between the public identity of the remote UE (20) and a further identity which is provided to the local UE (10; 60); —receiving a request for establishing an additional session, comprising the further identity of the remote UE (20); —replacing the further identity of the remote UE (20) with the public identity of the remote UE (20) and forwarding the request towards the remote UE (20). The invention is further about (Continued)

a network node (11; 12; 50) and a UE (10; 60) which are adapted to perform the method.

14 Claims, 4 Drawing Sheets

(52) U.S. Cl.
CPC ...... *H04L 65/1016* (2013.01); *H04L 65/1046* (2013.01); *H04L 65/1069* (2013.01); *H04L 65/1073* (2013.01); *H04L 65/1089* (2013.01); *H04M 3/42008* (2013.01); *H04M 7/0024* (2013.01)

(58) Field of Classification Search
CPC ............. H04L 65/1069; H04L 65/1073; H04L 65/1089; H04M 3/42008; H04M 7/0024
USPC ........................................................ 709/204
See application file for complete search history.

(56) References Cited

U.S. PATENT DOCUMENTS

| | | | |
|---|---|---|---|
| 2009/0073963 A1 | 3/2009 | Den Hartog et al. | |
| 2010/0313024 A1* | 12/2010 | Weniger | H04L 63/0823 713/170 |
| 2010/0331055 A1* | 12/2010 | Lothrop | H04M 1/2535 455/567 |
| 2011/0302316 A1* | 12/2011 | Chou | H04L 67/14 709/228 |
| 2013/0031257 A1* | 1/2013 | Klein | H04L 65/1016 709/227 |
| 2016/0057178 A1* | 2/2016 | Noldus | H04L 65/1016 709/228 |

OTHER PUBLICATIONS

3rd Generation Partnership Project, "3rd Generation Partnership Project; Technical Specification Group Services and System Aspects; Combined Circuit Switched (CS) and IP Multimedia Subsystem (IMS) sessions; Stage 1 (Release 11)", Technical Specification, 3GPP TS 22.279 V11.0.0, Sep. 1, 2012, pp. 1-15, 3GPP, France.

Motorola, "CSI origination towards public service numbers", 3GPP TSG SA WG2 #55, Oct. 23, 2006, pp. 1-2, Busan, South Korea, 3GPP.

* cited by examiner

METHOD AND APPARATUS FOR ESTABLISHING AN ADDITIONAL SESSION TO AN ANONYMOUS USER

TECHNICAL FIELD

The present invention generally relates to a method in a network node of an Internet Protocol Multimedia System, IMS, and to network nodes in an IMS, for establishing an additional session between a local UE, which is registered in the IMS, and a remote UE which public identity is unknown to the local UE, wherein a first session is established between the local UE and the remote UE.

BACKGROUND

The Internet Protocol Multimedia Subsystem, IMS, is an architectural framework for delivering IP multimedia services to a user. In addition, the industry has identified a need for detailed standardization of key IMS-based services, in particular for person-to-person communication. ETSI TISPAN (Telecoms & Internet converged Services & Protocols for Advanced Networks) has thus initiated the standardization of IMS-based multimedia telephony services (MMTel). 3GPP standard 22.173 Version 12.5.0 defines the MMTel service and the minimum set of capabilities required to secure multi-vendor and multi-operator inter-operability for Multimedia Telephony and related Supplementary Services. MMTel enables people to communicate using any combination of voice, video, and real-time text. It also defines a set of supplementary and regulatory services. An MMTel communication can start with only one type of media and additional types of media may or may not be added by the users as the communication progress.

Another possibility in IMS to add a supplementary service is the use of the Video Share service in IMS (also called as a Video share service, specified by GSMA). This service is used to allow users which are engaged in a Circuit-Switched, CS, voice call to add a unidirectional video streaming session over the packet network during the voice call. Any of the parties on the CS voice call can initiate a video streaming session. This Video Share service requires a 3GPP compliant IMS core system and is described is 3GPP standard document 22.279 Version 11.0.0 and GSMA official document IR. 74 and IR. 84. The Video Share service differs from a traditional Video Call service in that a Video Call involves simultaneous two-way Video and Audio transmission between the two parties (from start to finish), whereas the Video Share service involves adding and removing one or more one-way Video sessions to an existing voice call between the two parties. This new additional session, with any media, can be seen as a supplementary session as the communication endpoints are the same and the supplementary session is executed in parallel to the first established session. Therefore a Video Share session can be seen as an example of a supplementary session to the established CS voice call session.

Sometimes a calling user, which can be named as a remote user, has chosen to be anonymous to the called user, which can be named as a local user, so that the called user does not have the real identity of the calling anonymous user. It may also be possible that one user is connected behind a group number which is provided to the other participant of the session. If one user of a CS voice call session or an MMTel session has chosen to be anonymous or is using a group identity to the other user, it is not possible to establish a further session as a supplementary session because the identity of the user must be known to the user who would like to add a supplementary session, e.g. a Video Share Service.

SUMMARY

It is an object of the present invention to improve the establishment of an additional session between users which already have an ongoing session. This object is achieved by the independent claims. Advantageous embodiments are described in the dependent claims.

According to a first aspect, a method in a network node of an Internet Protocol Multimedia System, IMS, for establishing an additional session between a local UE, which is registered in the IMS, and a remote UE which public identity is unknown to the local UE is provided, wherein a first session is established between the local UE and the remote UE. A relation between the public identity of the remote UE and a further identity which is provided to the local UE is stored in the network node. A request for establishing an additional session is received by the network node which comprises the further identity of the remote UE. In the request the further identity of the remote UE is replaced with the public identity of the remote UE and the request is forwarded towards the remote UE.

According to another aspect, a network node in an Internet Protocol Multimedia System, IMS, for establishing an additional session between a local UE, which is registered in the IMS, and a remote UE which public identity is unknown to the local UE is provided, wherein a first session is established between the local UE and the remote UE. The network node comprises a storing unit, adapted to store a relation between the public identity of a remote UE and a further identity which is provided to a local UE. The network node further comprises a receiving unit, adapted to receive a request for establishing an additional session, comprising the further identity of the remote UE. The network node further comprises a processing unit, adapted to replace, in the request, the further identity of the remote UE with the public identity of the remote UE and a sending unit, adapted to forward the request towards the remote UE.

According to another aspect, a user equipment, UE, having a subscription to an Internet Protocol Multimedia System, IMS, wherein a first session is established between the UE and a remote UE, and wherein the public identity is unknown to the UE, is provided. The UE comprises a receiving unit, adapted to receive a further identity of the remote UE which is different to the public identity of the remote UE and a sending unit, adapted to send a request for establishing an additional session towards the further identity of the remote UE.

The present invention also concerns computer programs comprising portions of software codes or instructions in order to implement the method as described above when operated by at least one respective processing unit of a user device and a recipient device. The computer program can be stored on a computer-readable medium. The computer-readable medium can be a permanent or rewritable memory within the user device or the recipient device or located externally. The respective computer program can also be transferred to the user device or recipient device for example via a cable or a wireless link as a sequence of signals.

BRIEF DESCRIPTION OF THE FIGURES

In the following, the invention will further be described with reference to exemplary embodiments illustrated in the figures, in which.

DETAILED DESCRIPTION

In the below, for purposes of explanation and not limitation, specific details are set forth in order to provide a thorough understanding of the present invention. It will be apparent to one skilled in the art that the present invention may be practiced in other embodiments that depart from these specific details. For example, although the exemplary embodiments are described in connection with IMS standard terminology to illustrate the present invention, they are equally applicable to other kinds of mobile communication systems. Also, the invention may be practiced in any network to which mobile users may attach. For example, the present invention is applicable to, besides cellular networks, Local Area Networks (LANs), Wireless LANs (WLANs), or similar wireless networks, but also to wireline networks such as, for example, the intranet of a company or the Internet. Further, the term User Equipment (UE) used herein below may be any kind of mobile communication device like a mobile telephone, a Personal Digital Assistant (PDA), a network card, a laptop or any other mobile communication apparatus which is capable of communicating wirelessly (via an air interface) or wirelined with a network. Although a specific protocol stack is used below to describe the present invention, any other suitable protocol stack may equally be used.

Those skilled in the art will further appreciate that the functions explained herein below may be implemented using hardware circuitry, software means, or a combination thereof. The software means may be in conjunction with a programmed microprocessor or a general purpose computer, using an Application Specific Integrated Circuit (ASIC) and/or Digital Signal Processors (DSPs). It will also be apparent that when the present invention is described as a method, it may also be embodied in a computer processor and a memory coupled to the processor, wherein the memory is encoded with one or more programs that perform the method when executed by the processor.

The illustration in the drawing is schematic. In different drawings, similar or identical elements are provided with the same reference signs or with reference signs which are different from one another in the first digit.

Within the context of the present application the term local UE or remote UE may particularly denote a user of a user equipment having a subscription to a network operator for at least the use of an IMS network. Therefore the term UE has a meaning of a user using a user equipment which is e.g. equipped with a SIM card. This SIM card has been provided by the network operator and represents the subscription of the user equipment to a service of the network operator, like IMS. In the following it is mentioned that the UE is connected to a network or node. It is clear from the context of the description that the user is using the user equipment for executing a service, like having a call or a video session according to the subscription. For a better understanding the local UE 10 denotes a UE of a subscriber who will start an additional session with a remote UE 20. It is further assumed that the identity of the remote UE 20, e.g. the telephone number, SIP-address or any other public address is unknown to the local UE 10. It is therefore also possible that the local UE 10 becomes a remote UE 20 and the remote UE 20 becomes a local UE 10 if the former local UE 10 is unknown to the former remote UE 20. In a standard situation, an unknown party could be the caller as the called party must be known by the caller. Otherwise it is not possible for the caller to establish a call. In another embodiment it may be also possible that the called party is not directly known to the caller as the called party is contacted by an agent so that the caller must not know the public identity of the called party. It is therefore also possible that neither the local UE 10 is known by the remote UE 20 nor the remote UE 20 is known by the local UE 10.

Figure 1:
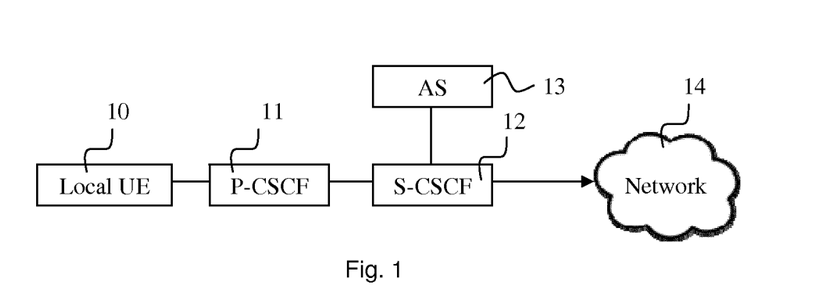
FIG. 1 shows a schematic illustration of an IMS network according to one embodiment of the invention.

FIG. 1 shows a setup in which a local UE 10 is connected with an IMS network via a Proxy-Call Session Control Function (P-CSCF) 11 with a Serving-CSCF (S-CSCF) 12. The local UE 10 may be connected via a access network with the P-CSCF 11. The access network may comprise a eNodeB or any other Access node which is adapted to handle mobile communications. An Application Server (AS) 13 in the IMS network is connected to the S-CSCF 12. This AS 13 can be a Video Share Application Server which is connected through an ICS Interface with the S-CSCF 12. The S-CSCF 12 and the AS 13 provides a central point for service control, provisioning and configuration in the network and for enforcing service policies such as admission control and registration control.

In another embodiment the AS 13 can be an IMS-based multimedia telephony services (MMTel) server for providing real-time multimedia communication using the media capabilities such as voice, real-time video, text, file transfer and sharing of multimedia content. For the establishment of a communication session the S-CSCF 12 is connected via a Network 16 which can be an Internet Protocol (IP) network to another User (not depicted).

Figure 2:
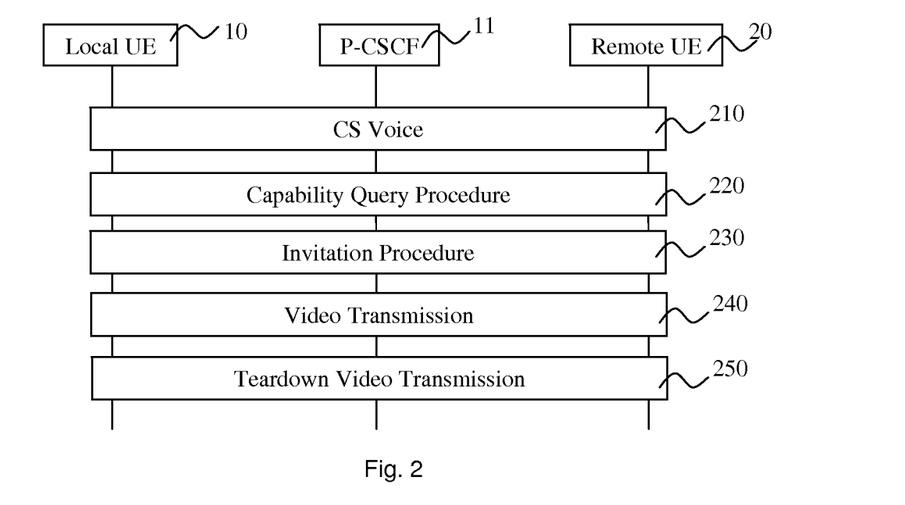
FIG. 2 shows an exemplary sequence diagram of a Video share service according to one embodiment of the invention.

FIG. 2 shows the basic steps for a Video Share session between a local UE 10 and a remote UE 20 over P-CSCF 11 in IMS according to one embodiment of the invention. The Video Share session begins with an established CS voice call 210 between the local UE 10 and the remote UE 20. The next step 220 is the Capability Exchange in which one handset or UE 10, 20 is queried to determine if the recipient is capable of supporting a Video Share session. This can be performed by executing a SIP OPTIONS method. The SIP OPTION method allows a client to discover information about the supported methods, content types, extensions, codecs, etc. without "ringing" the other party. The local UE 10 and remote UE 20 should perform this capability exchange. The Video Share session is initiated by one of the parties 10, 20 in a next step 230 by sending a SIP INVITE message to the other party 10, 20. This can e.g. be done by activating a Video Share session over an installed application at the local or remote UE 10, 20. After the Video Share session has been set up, transmission of the actual video is performed in a step 240. A possible protocol for sending videos is RTP (Real-Time Transport Protocol), which is widely used in internet and mobile communities for video streaming. When either party, the local subscriber with the local UE 10 or the remote subscriber with the remote UE 20, decide to stop the Video Share session, the session will be torn down in a step 250 (using e.g. RTCP BYE) and the SIP session stopped (using e.g. SIP BYE). After these steps the CS voice call session still exists.

Figure 3:
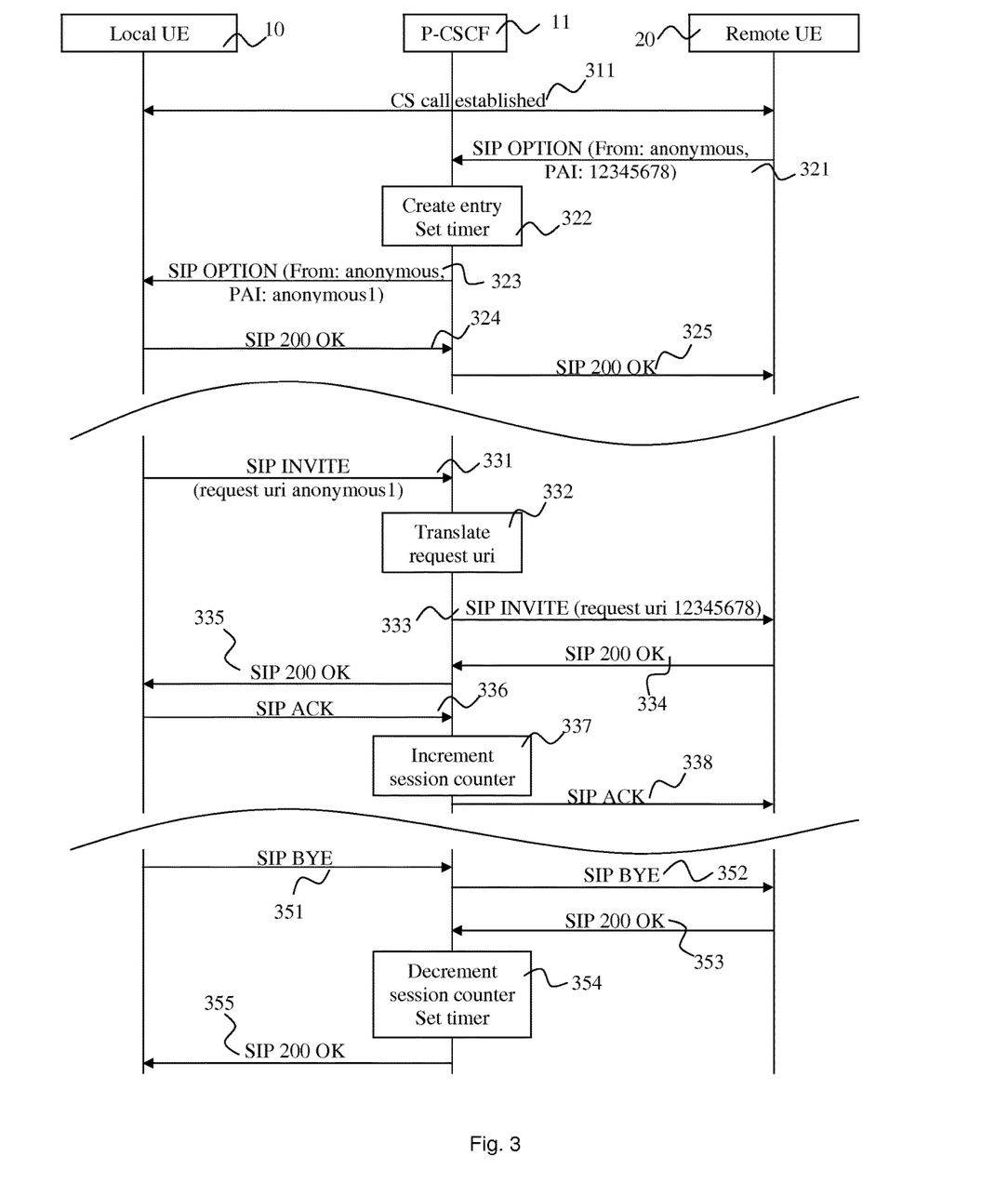
FIG. 3 shows an exemplary sequence diagram of an embodiment of the invention.

FIG. 3 shows a first embodiment of the invention wherein a local UE 10 and a remote UE 20 are connected via a P-CSCF 11 in an IMS network. In a first step 311 a CS voice call has already been established between the local UE 10 and the remote UE 20 (and the subscribers respectively). It is further assumed that the user of the remote UE 20 has chosen to be anonymous to the user of the local UE 10. The user of the local UE 10 is therefore not aware of the identity of the calling remote user of the remote UE 20. In a next step 321 a SIP OPTION message is send from the remote UE 20 towards the local UE 10 via the P-CSCF 11. This SIP OPTION message comprises at least the identification information of the remote UE 20 which can be the P-asserted identity header. In the FROM-header the identity can be an anonymized identity (e.g. "anonymous"). The P-CSCF 11 receives the SIP OPTION message and creates an entry in a database in step 322 which may be located at the P-CSCF 11 or may be a separate database in another node. It may also be possible that a S-CSCF 12 or any other separate entity or node along the signaling path in the IMS is handling the database or comprises a database with the entries according to the invention. The table entry comprises a relation between the remote public ID which is not known to the local UE 10 and an anonymized identity (ID) which is provided to the local UE 10. In a next step 323 an adapted SIP OPTION message is forwarded towards the local UE 10. The adapted SIP OPTION message comprises an anonymized P-asserted identity which is the same identity as stored in the entry of the database in the P-CSCF 11. In step 324 the local UE 10 sends a SIP 200 OK message towards the unknown remote UE 20 with the anonymized identity which is translated by the P-CSCF into the remote public ID of the remote UE 20. The adapted SIP 200 OK message with the corrected receiver is forwarded towards the remote UE 20 in step 325.

It may also be possible to set a timer for this entry in step 322. If there is no establishment of an additional session between the local UE 10 and remote UE 20 until the timer expires, the stored database-entry (relation between the remote public ID and the anonymized ID of the remote UE 20) will be deleted or removed from the database/table. It may be possible to set the timer to a period which is at least as long as the period between two SIP OPTION messages.

In a further embodiment the P-CSCF 11 checks if the identity in the FROM-header-field is different to the identity of the P-asserted-Identity-Header. If e.g. the FROM-header is "anonymous" and the P-asserted-Identity comprises the public identity of the remote UE 20 then an entry is created. If the FROM-header comprises a public identity of the remote UE 20 then the remote UE 20 is not unknown to the local UE 10 so that there is no need to store any relations. The P-CSCF 11 may check beforehand whether the remote UE 20 is anonym to the local UE 10 or not.

Figure 4:
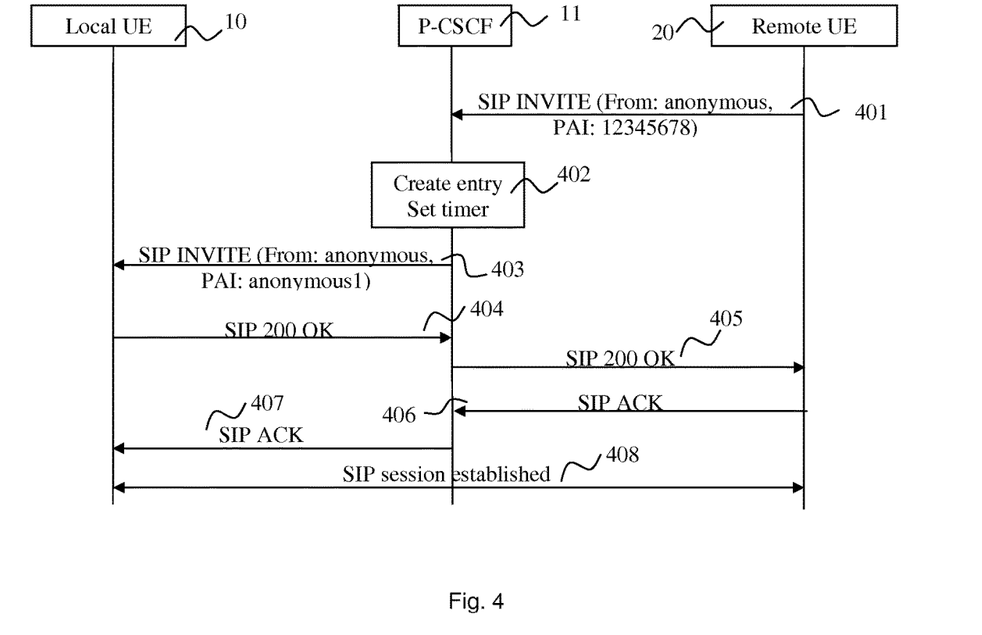
FIG. 4 shows an exemplary sequence diagram of another embodiment of the invention.

Another embodiment of the invention is shown in FIG. 4 wherein the entry in the database/table is created by the P-CSCF 11 before the first session has been established in step 408 between the local UE 10 and the remote UE 20. A SIP INVITE message from a remote UE 20, for which the user of the remote UE 20 has been decided to be anonymous, is received by the P-CSCF 11. The FROM-field comprises a "dummy"-address which shows that the remote UE 20 should by anonymous to the local UE 10. In this example the ID is "anonymous". It also can be any other address which is not the remote public ID. The P-asserted ID of the SIP INVITE message comprises the remote public ID which is in this example "12345678". The P-CSCF 11 determines that the remote UE 20 should be an anonymous party with an unknown ID to the local UE 10 and creates an entry in the database in a step 402. Further it may be possible to set a timer to delete the entry after the timer expires. The P-asserted ID of the SIP INVITE message is replaced by an anonymized ID according to the entry in the table and is forwarded towards the local UE 10 in step 403. After a SIP 200 OK message has been received in step 404 and the anonymized ID has been replaced by the remote public ID of the remote UE 20 the adapted SIP 200 OK message is forwarded towards the remote UE 20 in step 405. After a SIP ACK message is forwarded towards the local UE 10 in steps 406 and 407—including an address translation—the SIP session is established in step 408.

According to the first part of FIG. 3 and whole FIG. 4 there are different possibilities for establishing an entry in the database comprising a relation between the remote public ID and an anonymized ID which is provided to the local UE 10.

The second part of FIG. 3 comprises an embodiment of the invention wherein the local UE 10 establishes a supplementary session or an additional session towards the remote UE 20. It may e.g. possible that the user of the local UE 10 starts a subroutine on the UE 10 which allows the establishment of an additional video session with the remote UE 20. Therefore the local UE 10 sends in step 331 a SIP INVITE message with a request URI "anonymous1" towards the remote UE 20 via the P-CSFC 11 according to the stored anonymized ID. The local UE 10 ignores the fact that the identity of the remote UE 20 is unknown. After reception of the SIP INVITE message the P-CSCF 11 translates in step 332 the anonymized request URI into a request URI of the remote UE 20, which is in this case "12345678" and forwards the SIP INVITE message with the translated request URI towards the remote UE 20 in step 333. The remote UE 20 sends a SIP 200 OK message in step 334 towards the P-CSCF 11 if the user of the remote UE 20 accepts the establishment of an additional or supplementary session to the already established first session. The SIP 200 OK message is forwarded, after translation of the sending address by the P-CSCF 11, towards the local UE 10 in step 335. The local UE 10 answers with a SIP ACK message in step 336 which is received by the P-CSCF 11. The SIP ACK message is an indication for the P-CSCF 11 that an additional session has been established successfully. According to one embodiment of the invention a session counter is incremented. After the SIP ACK message has been adapted accordingly it is forwarded by the P-CSCF 11 in step 338 towards the remote UE 20.

It may also be possible that the remote UE 20 requests the establishment of an additional session with the local UE 10. In this case the SIP INVITE message is sent from the remote UE 20 via the P-CSCF 11 towards the local UE 10, comprising the remote public ID which is replaced by the anonymized ID in the P-CSCF according the table entry in the database.

It may be possible that the request for establishing an additional session or a supplementary session to the first session comprises in addition an indicator which indicates to network that the additional session is related to the already established first session. This indicator may be a session identifier for identifying the first session. If the network identifies the indicator then it may be easier for the network to establish a second session because some of the already used parameters can be re-used for the additional session. The authentication procedure may be simplified or even completely left out.

A third part of FIG. 3 shows an embodiment of the invention, wherein the local UE 10 stops or terminates an additional session by sending a SIP BYE command in step 351 towards the unknown remote UE 20. The P-CSCF 11 receives the message, translates the identity of the receiver in accordance with the entry in the database and forwards the SIP BYE message with the adapted receiver-ID of the remote UE 20 towards the remote UE 20 in a step 352. The remote UE 20 answers with a SIP 200 OK message in step 353 which is received by the P-CSCF 11. The SIP 200 OK message is an indicator for the P-CSCF 11 that the additional or supplementary session has been stopped or terminated and that the remote UE 20 has accepted this. In one embodiment of the invention the session counter is decremented and—if the counter reaches zero—a timer may be started. This is shown in step 354. After the timer expires, the relation between the anonymized address of the remote UE 20 and the remote public ID of the remote UE 20 is removed from the database and the anonymized address can be used for another connection. The SIP 200 OK message is forwarded in step 355 towards the local UE 10 after the remote public ID has been replaced by the anonymized address according to the stored relation in the database. It may also be possible that the remote UE 20 starts the termination of the additional session. Then the SIP BYE message is sent from the remote UE 20 towards the local UE 10.

Table 1 shows an example of a database entry for the local UE 10 in the P-CSCF 11:

TABLE 1

| Anonymous ID | Remote public ID | Session Counter | Timer |
|---|---|---|---|
| sip:anon1@operator.ims.net | tel: +00112233 | 3 | — |
| sip:anon2@operator.ims.net | tel: +44556677 | 1 | — |
| sip:anon3@operator.ims.net | tel: +88990011 | 0 | 10 |
| sip:anon4@operator.ims.net | — | 0 | — |
| sip:anon5@operator.ims.net | — | 0 | — |

In this example the local UE 10 has established two sessions with different parties, identified by their remote public IDs which are not known by the local UE 10. The remote public IDs have been determined from the SIP OPTION message according to the embodiment of FIG. 3 with the included P-asserted identity or from a SIP INVITE message which also includes the P-asserted identity according to the embodiment of FIG. 4. The table therefore contains a relation between an anonymous ID which is provided to the locale UE 10 and a remote public ID which is not known by the local UE 10, but is known in the IMS by the network operations (e.g. routing purposes or charging).

In one embodiment a session counter counts the established additional sessions between the local UE 10 and the respective remote UE 20 without counting the first session between the respective parties. The session counter increments by one if a further additional session is established between the local UE 10 and one of the other parties which can be a remote UE 20. If one of the additional sessions is terminated by one of the parties of this session, the session counter decrements by one. If the session counter reaches zero the main or first session is still established. Therefore the table or database entry for the local UE 10 can be very short if only the additional sessions will establish a table entry in the database. If the first session is a non-SIP session (e.g. a CS voice session) then it is also an advantage for the implementation of the counter to just count SIP sessions. To delete a table entry it is further proposed in another embodiment to establish a timer for each communication between the local UE 10 and one of the remote UEs 20 if the session counter reaches zero. After a pre-defined time the table entry is removed so that the previous used anonymous ID can be used for a future communication between the local UE 10 and a remote UE 20. Table 1 comprises an example in which 3 additional sessions have been established between the local UE 10 and the anonymized party sip:anon1@operator.ims.net with the public ID Tel: +00112233, which is not known by the local UE 10. The anonymized ID can also be different, like sip:anonymous1@ anonymous-.invalid. The local UE 10 has further established one additional session with an unknown remote UE which is known to the local UE 10 as anon2@operator.ims.net. It is important that the anonymized identities are different for the different parties or remote UEs. The table further comprises a third entry of a communication with a third unknown remote UE which is known to the local UE 10 as anon3@operator.ims.net. For this communication the additional session has been terminated by either the local UE 10 or the remote UE "anon3". There is no existing additional session so that the session counter is set to zero and— according to an embodiment of the invention—a timer has been set. This timer decrements to zero. It may also be possible that the timer is set to zero and increments to a defined value. After the timer expires (reaches zero or the pre-defined value) the relation between the anonymous or unknown user (e.g. "anon3") and the public identity (e.g. "Tel: +88990011") is removed or deleted from the table or database. According to the example of table 1 there are two available anonymized identities (anon4@operator.ims.net and anon5@operator.ims.net) which are currently not used. It is therefore possible, according to this example of table 1, that the local UE 10 is able to establish sessions with 5 anonym or unknown parties and establishing additional sessions to these 5 parties. After the deletion of the entry with the expired timer the anonymized identity anon3@operator.ims.net is in addition available for future additional communications. It may also be possible that the table comprises more or less available anonymized identities. This depends on the storage and the pre-setting of the operator.

The number of established session may also comprise the first session which can be e.g. a CS voice call. If the session counter is zero then no session (first session or additional session) is established between the local UE 10 and the respective remote UE 20. If the session counter reaches zero then the relation can immediately be removed from the table. According to this embodiment the table entry can be created when the first session has been established. It may be possible that this embodiment is related to the embodiment according FIG. 4 in which the SIP INVITE message from the remote UE 20, which user has decided to be anonymous for the local UE 10, initiates the creation of a table entry in the P-CSCF 11.

Figure 5:
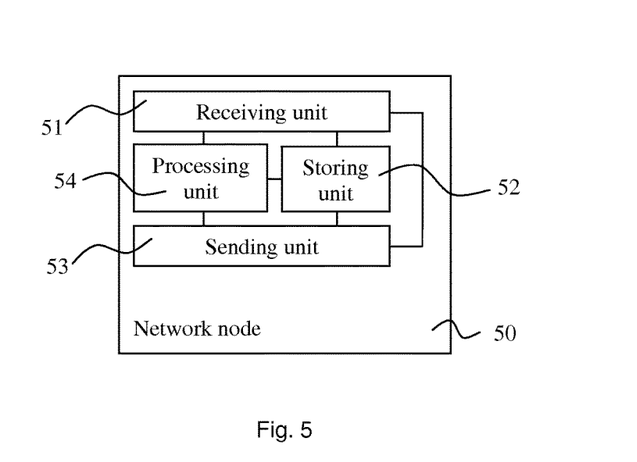
FIG. 5 shows a schematic illustration of a network node according to one embodiment of the invention.

FIG. 5 shows an embodiment of a network node 50 according to one aspect of the invention. The network node 50 can be a P-CSCF 11, a S-CSCF 12 or another node in an IMS network along the signalling path between the local UE 10 and the remote UE 20 which is adapted to receive the public identity of the remote UE 20. The network node 50 is adapted to establish an additional session between a local UE 10 which is registered in the IMS, and a remote UE 20 which public identity is unknown to the local UE 10. It is further assumed that a first session is established between the local UE 10 and the remote UE 20. The network node 50 comprises a storing unit 52, adapted to store a relation between the public identity of the remote UE 20 and a further identity which is provided to a local UE 10. The network node 50 further comprises a receiving unit 51, adapted to receive a request for establishing an additional session, comprising the further identity of the remote UE. A processing unit 54 in the network node 50 is adapted to replace the further identity of the remote UE 20 with the public identity of the remote UE 20. The network node 50 further comprises a sending unit 53, adapted to forward the request towards the remote UE 20.

Figure 6:
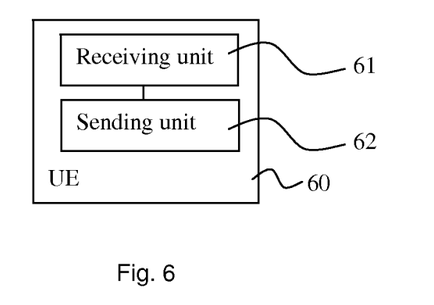
FIG. 6 shows a schematic illustration of a user equipment according to one embodiment of the invention.

FIG. 6 shows an embodiment of an user equipment (UE) 60 according to one aspect of the invention. This UE 60, which could be a local UE 10, has a subscription to an Internet Protocol Multimedia System, IMS. A first session is established between the UE 60 and a remote UE 20 of a remote user. The public identity is unknown to the UE 60. The UE 60 comprises at least a receiving unit 61 and a sending unit 62. The receiving unit 61 is adapted to receive a further identity of the remote UE 20 which is different to the public identity of the remote UE 20. The sending unit 62 is adapted to send a request for establishing an additional session towards the further identity of the remote UE. The UE 60 will therefore ignore the fact that the remote user is unknown to him and nevertheless send a request for establishing an additional session towards the unknown remote user 20. The UE 60 ignores the fact that the identity of the remote user is unknown.

Figure 7:
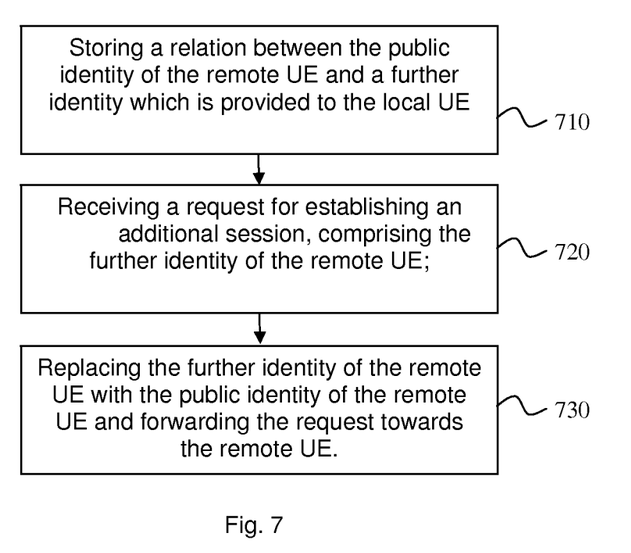
FIG. 7 shows a flow diagram of an embodiment of the inventive method.

FIG. 7 shows a flow diagram of an embodiment of the inventive method. In a first step 710 a relation between the public identity of the remote UE 20 or local user 20 and a further identity which is provided to the local UE 10, 60 is stored in a network node 11 of an Internet Protocol Multimedia System (IMS). This further identity can be an identity according to table 1. As an example the further identity is "sip:anon1@operator.ims.net" and the relation between this further identity and the public identity: "Tel: +00112233" according to the first row of table 1 in this example is stored in the network node 11, 12, 50. This public identity is not known by the local UE 10, 60 or local user. The local user or local UE 10, 60 receives the further identity sip: anon1@operator.ims.net which can be displayed on a screen of the local users UE 10, 60. It may also be possible that a "dummy" address—like "unknown"—is displayed to the local user. It is further assumed that a first session is established between the local UE 10, 60 and the remote UE 20. This first session can be a CS voice call wherein the local UE 10, 60 or local user is known to the other party and the remote UE 20 or remote user is not known to the local user. In a further step 720 the network node 11, 12, 50 receives a request for establishing an additional session. This request comprises the further identity of the remote UE 20. The request can be provided by the local UE 10, 60 to the network node 11, 12, 50. In a third step 730 the further identity of the remote UE 20 is replaced with the public identity of the remote UE 20 and the request is forwarded towards the remote UE 20.

The invention claimed is:

1. A method, in a network node of an Internet Protocol Multimedia System (IMS), for establishing an additional session between a local user equipment (UE) which is registered in the IMS, and a remote UE which public identity is unknown to the local UE, wherein a first session is established between the local UE and the remote UE, the method comprising:

storing a relation between the public identity of the remote UE and a further identity which is provided to the local UE;

receiving a request for establishing an additional session, the request comprising the further identity of the remote UE;

replacing the further identity of the remote UE with the public identity of the remote UE and forwarding the request towards the remote UE;

wherein:

for each established additional session with the remote UE which is related to the first session, a session counter is increased;

for each terminated additional session with the remote UE which is related to the first session, the session counter is decreased;

after all additional sessions with the remote UE are terminated, the relation between the public identity of the remote UE and the further identity is deleted;

wherein, in response to all additional sessions with the remote being terminated:

a deletion time is started; and in response to expiration of the deletion times, the relation between the public identity of the remote UE and the further identity is deleted.

2. The method of claim 1, wherein the relation between the public identity of the remote UE and the further identity is retrieved at the session establishment of the first session from a Session Initiation Protocol (SIP) INVITE message received from the remote UE.

3. The method of claim 1, wherein the relation between the public identity of the remote UE and the further identity is retrieved from a status tracking message received from the remote UE.

4. The method of claim 3, wherein the status tracking message is a Session Initiation Protocol (SIP) OPTION message.

5. The method of claim 2, wherein the relation between the public identity of the remote UE and the further identity is only stored if the identity in a FROM-header of the received SIP message is different than the identity in a P-Asserted-Identity header of the received SIP message.

6. The method of claim 1, wherein the additional session is related to the first session in that the local UE and the remote UE are identical for both sessions.

7. The method of claim 6, wherein the request for establishing an additional session comprises a reference to the first session.

8. The method of claim 2, wherein the further identity of the remote UE is stored in a P-Asserted-Identity header of the SIP message which is forwarded to the local UE.

9. The method of claim 1, wherein the relation between the public identity of the remote UE and the further identity is deleted after a predefined time.

10. The method of claim 1, wherein for each remote UE to which the local UE has established an additional session and which public identity is unknown to the local UE, a different further identity is used.

11. The method of claim 1, wherein the first session is a circuit switched voice session and the additional session is a video share session or an image share session.

12. The method of claim 1, wherein the network node is one of the following nodes which is handling signaling of the first and additional sessions:

a Proxy Call Session Control Function;
a Serving Call Session Control Function;
a node along the signaling path between the local UE and the remote UE, which is adapted to receive the public identity of the remote UE.

13. A network node in an Internet Protocol Multimedia System (IMS) for establishing an additional session between a local UE, which is registered in the IMS, and a remote UE which public identity is unknown to the local UE, wherein a first session is established between the local UE and the remote UE, the network node comprising:
  a storing circuit configured to store a relation between the public identity of a remote UE and a further identity which is provided to a local UE; a receiving circuit configured to receive a request for establishing an additional session, the request comprising the further identity of the remote UE; a processing circuit configured to replace the further identity of the remote UE with the public identity of the remote UE; and
  a sending circuit configured to forward the request towards the remote UE;
  wherein the storing circuit is configured such that:
    for each established additional session with the remote UE which is related to the first session, a session counter is increased;
    for each terminated additional session with the remote UE which is related to the first session, the session counter is decreased;
    after all additional sessions with the remote UE are terminated, the relation between the public identity of the remote UE and the further identity is deleted;
  wherein the network node is configured to, in response to all additional sessions with the remote UE being terminated:
    start a deletion timer; and
    delete, in response to expiration of the deletion times, the relation between the public identity of the remote US and the further identity.

14. A computer program product stored in a non-transitory computer readable medium for controlling a network node of an Internet Protocol Multimedia System (IMS), and for assisting in the establishment of an additional session between a local user equipment (UE) which is registered in the IMS, and a remote UE which public identity is unknown to the local UE, wherein a first session is established between the local UE and the remote UE, the computer program product comprising software instructions which, when run on processing circuitry of the network node, causes the network node to:
  store a relation between the public identity of the remote UE and a further identity which is provided to the local UE;
  receive a request for establishing an additional session, the request comprising the further identity of the remote UE;
  replace the further identity of the remote UE with the public identity of the remote UE and forward the request towards the remote UE;
  wherein:
    for each established additional session with the remote UE which is related to the first session, a session counter is increased;
    for each terminated additional session with the remote UE which is related to the first session, the session counter is decreased;
    after all additional sessions with the remote UE are terminated, the relation between the public identity of the remote UE and the further identity is deleted;
  wherein the software instructions are such that they, when run on the processing circuitry of the network node, cause the network node to, in response to all additional sessions with the remote UE being terminated:
    start a deletion timer; and
    delete, in response to expiration of the deletion timer, the relation between the public identity of the remote UE and the further identity.

* * * * *